US012746782B2

(12) United States Patent
Skurich et al.

(10) Patent No.: US 12,746,782 B2
(45) Date of Patent: Sep. 29, 2026

(54) TIRE WITH SIPES

(71) Applicant: The Goodyear Tire & Rubber Company, Akron, OH (US)

(72) Inventors: Michael Stefan Skurich, North Canton, OH (US); Zachary William Juergens, Akron, OH (US); Nicholas Thomas Schoeppner, Canton, OH (US); Lac An Nguyen, Wadsworth, OH (US); Tibor Fülöp, Erpeldange-Wiltz (LU); Brian James Jakubowski, Uniontown, OH (US); Kei Hayakawa, Uniontown, OH (US); Richard Mark Wieland, Akron, OH (US); Thomas Andrew Laurich, Fairlawn, OH (US); Robert Wayne Schott, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 19/069,733

(22) Filed: Mar. 4, 2025

(65) Prior Publication Data

US 2026/0264457 A1 Sep. 10, 2026

(51) Int. Cl.
*B60C 11/12* (2006.01)
*B60C 11/03* (2006.01)

(52) U.S. Cl.
CPC ...... *B60C 11/1281* (2013.01); *B60C 11/0302* (2013.01); *B60C 11/1236* (2013.01); (Continued)

(58) Field of Classification Search
CPC ............. B60C 11/0302; B60C 11/1263; B60C 11/1281; B60C 11/0323; B60C 2011/1245
See application file for complete search history.

(56) References Cited

U.S. PATENT DOCUMENTS

D355,876 S 2/1995 Diensthuber
D361,966 S 9/1995 Graas et al.
(Continued)

FOREIGN PATENT DOCUMENTS

EM 002221085-0002 4/2013
EP 213452 A2 * 3/1987
(Continued)

OTHER PUBLICATIONS

Machine translation for Europe 12230534 (Year: 2025).*
(Continued)

*Primary Examiner* — Steven D Maki
(74) *Attorney, Agent, or Firm* — Eryn Fuhrer; June E. Rickey

(57) ABSTRACT

In one aspect, the present invention is directed to a tire having a tread portion with tread blocks arranged in a V-shaped pattern. At least one of the tread blocks comprises a lateral sipe with a bump stop protruding into the sipe from one sidewall of the sipe towards an opposite sidewall of the sipe and extending along a radial direction to avoid closing of the sipe adjacent the bump stop due to forces transversal to the lateral sipe. In a second aspect, a tread portion of a tire comprises sipes with pairs of first and second bump stops facing each other and comprising oppositely oriented wedged shapes. In a third aspect, the invention is directed to a tire with tread blocks arranged in a V-shaped pattern, and further comprising tread blocks with chamfered edges, laterally and transversally extending sipes, transversally extending sipes with notches, and sipes with bump stops.

3 Claims, 10 Drawing Sheets

(52) U.S. Cl.
CPC ................ *B60C 2011/1213* (2013.01); *B60C 2011/1245* (2013.01)

(56) References Cited

U.S. PATENT DOCUMENTS

| | | | |
|---|---|---|---|
| D379,449 | S | 5/1997 | Graas et al. |
| D441,328 | S | 5/2001 | Heinen |
| D504,387 | S | 4/2005 | Welbes et al. |
| D505,111 | S | 5/2005 | Allison et al. |
| D505,112 | S | 5/2005 | Heinen et al. |
| D533,131 | S | 12/2006 | Fontaine et al. |
| D548,677 | S | 8/2007 | Welbes et al. |
| D548,678 | S | 8/2007 | Welbes et al. |
| D548,679 | S | 8/2007 | de Briey-Terlinden |
| D551,613 | S | 9/2007 | Lo |
| D591,221 | S | 4/2009 | Fontaine et al. |
| D595,640 | S | 7/2009 | de Briey-Terlinden |
| D606,007 | S | 12/2009 | Fontaine et al. |
| D615,479 | S | 5/2010 | Lee |
| D640,184 | S | 6/2011 | De Briey-Terlinden |
| D670,235 | S | 11/2012 | De Briey-Terlinden |
| D702,625 | S | 4/2014 | Leconte et al. |
| D702,626 | S | 4/2014 | de Briey-Terlinden |
| D711,309 | S | 8/2014 | Kawakita et al. |
| D716,720 | S | 11/2014 | Seng et al. |
| D718,224 | S | 11/2014 | Guichon et al. |
| D722,555 | S | 2/2015 | Knispel et al. |
| D723,453 | S | 3/2015 | Knispel et al. |
| D733,038 | S | 6/2015 | Raatikainen et al. |
| D733,639 | S | 7/2015 | Fontaine et al. |
| D741,249 | S | 10/2015 | Kouda et al. |
| D746,218 | S | 12/2015 | Raatikainen et al. |
| D754,588 | S | 4/2016 | Hye et al. |
| D756,292 | S | 5/2016 | Yoon |
| D756,293 | S | 5/2016 | Mathonet et al. |
| D756,894 | S | 5/2016 | Pons et al. |
| D756,896 | S | 5/2016 | Leconte et al. |
| D758,286 | S | 6/2016 | Hye et al. |
| D766,813 | S | 9/2016 | Wang et al. |
| D773,978 | S | 12/2016 | Higashiura |
| D777,091 | S | 1/2017 | de Briey-Terlinden et al. |
| D778,230 | S | 2/2017 | Haanketo et al. |
| D780,672 | S | 3/2017 | Yoon |
| D792,836 | S | 7/2017 | Davis et al. |
| D794,545 | S | 8/2017 | Houchard et al. |
| D795,167 | S | 8/2017 | Houchard et al. |
| D797,653 | S | 9/2017 | Raatikainen et al. |
| D806,000 | S | 12/2017 | Diensthuber et al. |
| D810,003 | S | 2/2018 | Thieman |
| D810,004 | S | 2/2018 | Hutz et al. |
| D810,668 | S | 2/2018 | Cavro |
| D811,990 | S | 3/2018 | Raatikainen et al. |
| D812,548 | S | 3/2018 | Raatikainen et al. |
| D816,591 | S | 5/2018 | Kossi et al. |
| D816,592 | S | 5/2018 | de Briey-Terlinden |
| D818,939 | S | 5/2018 | Boisdon et al. |
| D819,551 | S | 6/2018 | Uchida |
| D825,445 | S | 8/2018 | Boisdon et al. |
| D830,287 | S | 10/2018 | Proietti |
| D832,192 | S | 10/2018 | Shondel |
| D832,194 | S | 10/2018 | de Briey-Terlinden et al. |
| D832,195 | S | 10/2018 | de Briey-Terlinden et al. |
| D845,881 | S | 4/2019 | Kossi et al. |
| D845,883 | S | 4/2019 | Son |
| D852,731 | S | 7/2019 | De Briey-Terlinden et al. |
| D853,941 | S | 7/2019 | de Briey-Terlinden et al. |
| D860,127 | S | 9/2019 | Tae |
| D860,128 | S | 9/2019 | De Liddo et al. |
| D860,922 | S | 9/2019 | Montarras et al. |
| D860,923 | S | 9/2019 | De Liddo et al. |
| D864,845 | S | 10/2019 | Djabour |
| D866,453 | S | 11/2019 | Van't et al. |
| D867,268 | S | 11/2019 | Ishino |
| D868,677 | S | 12/2019 | Kossi et al. |
| D868,678 | S | 12/2019 | Geelen et al. |
| D870,024 | S | 12/2019 | Montarras et al. |
| D870,025 | S | 12/2019 | Speziari et al. |
| D871,315 | S | 12/2019 | De Liddo |
| D872,685 | S | 1/2020 | Fujimoto |
| D879,017 | S | 3/2020 | Amenta et al. |
| D879,018 | S | 3/2020 | Amenta et al. |
| D894,102 | S | 8/2020 | Pribula |
| D895,534 | S | 9/2020 | Sparacino et al. |
| D896,161 | S | 9/2020 | Koetter et al. |
| D897,938 | S | 10/2020 | Kawakita |
| D900,010 | S | 10/2020 | Koetter et al. |
| D900,712 | S | 11/2020 | Santangeli |
| D900,713 | S | 11/2020 | Moia et al. |
| D900,714 | S | 11/2020 | Geelen et al. |
| D904,970 | S | 12/2020 | Tikka et al. |
| D922,308 | S | 6/2021 | Son |
| D930,563 | S | 9/2021 | Koetter et al. |
| D933,580 | S | 10/2021 | Harris |
| D935,983 | S | 11/2021 | Moia et al. |
| D940,637 | S | 1/2022 | Park et al. |
| D956,668 | S | 7/2022 | Ishizu et al. |
| D960,080 | S | 8/2022 | Zuilekom et al. |
| D984,363 | S | 4/2023 | Pang et al. |
| D985,476 | S | 5/2023 | Moia et al. |
| D998,546 | S | 9/2023 | Qin et al. |
| D1,000,366 | S | 10/2023 | Skurich |
| D1,003,225 | S | 10/2023 | Geelen et al. |
| D1,005,221 | S | 11/2023 | Herbeuval et al. |
| D1,021,758 | S | 4/2024 | Chauveheid et al. |
| D1,027,811 | S | 5/2024 | Nguyen |
| D1,031,624 | S | 6/2024 | Kim |
| D1,037,136 | S | 7/2024 | Nguyen |
| D1,049,011 | S | 10/2024 | Sharma |
| 2003/0029537 | A1* | 2/2003 | Iwamura ................ B60C 11/12 152/209.18 |
| 2008/0295937 | A1 | 12/2008 | Ohashi |
| 2011/0290393 | A1 | 12/2011 | Berger et al. |
| 2019/0176536 | A1* | 6/2019 | Yasunaga ............ B60C 11/0309 |
| 2019/0176537 | A1* | 6/2019 | Yasunaga ............ B60C 11/1204 |
| 2021/0188013 | A1* | 6/2021 | Morito ................ B60C 11/1259 |
| 2022/0203776 | A1* | 6/2022 | Kuriyama ........... B60C 11/1392 |
| 2022/0402307 | A1* | 12/2022 | Boisdon .............. B60C 11/0311 |
| 2024/0359506 | A1 | 10/2024 | Montesello et al. |

FOREIGN PATENT DOCUMENTS

| | | | | |
|---|---|---|---|---|
| EP | 564435 | A1 | 10/1993 | |
| EP | 846578 | A2 | 6/1998 | |
| EP | 1223054 | A1 * | 7/2002 | ......... B60C 11/1218 |
| JP | 2007223493 | A | 9/2007 | |
| JP | 2013006549 | A | 1/2013 | |
| JP | 1702216 | | 12/2021 | |
| KR | 300923608 | | 9/2017 | |
| WO | 2024049797 | A1 | 3/2024 | |

OTHER PUBLICATIONS

Machine translation for Europe 213452 (Year: 2026).*

Kenji Bekku, Michelin CROSSCLIMATE Series, Car Graphic, Tyre Test, Apr. 1, 2019, pp130, No. 4, vol. 58.

* cited by examiner

TIRE WITH SIPES

FIELD OF THE INVENTION

The present invention is directed to a tire, such as a pneumatic tire, comprising a tread portion having sipes.

BACKGROUND OF THE INVENTION

Winter tires and modern all-season tires typically have tread portions with sipes, which help to improve winter performance such as the grip of the tires on snow. While advanced tread portions have been developed over the past decades, significant room for improvement remains.

SUMMARY OF THE INVENTION

In a first aspect, the present invention is directed to a tire comprising a circumferential tread portion having two axially opposite circumferential shoulder regions, a circumferential center region provided axially between the shoulder regions, a plurality of tread blocks arranged in a V-shaped pattern, and a plurality of lateral grooves which extend from a respective one of the shoulder regions to the circumferential center region. Furthermore, at least one of the tread blocks comprises at least one laterally elongated sipe having a pair of laterally extending opposite sidewalls, wherein a first sidewall of the pair of sidewalls comprises a bump stop protruding into the sipe towards an opposite sidewall of the pair of sidewalls and extending along a radial direction of the sipe to avoid closing of the sipe adjacent the bump stop due to forces transversal to the laterally elongated sipe.

In a second aspect, the present invention is directed to a tire comprising a circumferential tread portion having tread blocks, wherein at least one of the tread blocks comprises at least one laterally elongated sipe having a pair of laterally extending opposite sidewalls, and at least one pair of bump stops. Furthermore, a first sidewall of the pair of sidewalls comprises a first bump stop of the pair of bump stops, which protrudes into the sipe towards an opposite second sidewall of the pair of sidewalls. The second sidewall of the pair of sidewalls comprises a second bump stop of the pair of bump stops, which protrudes into the sipe towards the first sidewall of the pair of sidewalls. Still in accordance with the second aspect, the first bump stop comprises a first wedged shape increasing in thickness from a radially outer portion of the sipe towards a radially inner bottom of the sipe, and the second bump stop comprises a second wedged shape increasing in thickness from the radially inner bottom of the sipe towards a radially outer portion of the sipe, wherein the first bump stop and the second bump stop face each other.

In a third aspect, the present invention is directed to a tire comprising a circumferential tread portion having two axially opposite circumferential shoulder regions, a circumferential center region provided axially between the shoulder regions, tread blocks arranged in a V-shaped pattern, and lateral grooves which extend from a respective one of the shoulder regions to the circumferential center region. A plurality of the tread blocks comprises one or more of chamfered leading edges and chamfered trailing edges, and wherein, for a plurality of the tread blocks, each tread block comprises a first sipe extending in a lateral direction and a second sipe, extending transversally to the first sipe. Furthermore, at least one of the tread blocks comprising the second sipe comprises a notch at a transversal end of the second sipe and at one of the chamfered leading edges and chamfered trailing edges, wherein the notch is laterally broader and radially deeper than the second sipe. Still in accordance with the third aspect, at least one of the tread blocks comprises at least one laterally elongated sipe having a pair of laterally extending opposite sidewalls, and wherein a first sidewall of the pair of sidewalls optionally comprises a bump stop protruding into the sipe towards an opposite sidewall of the pair of sidewalls and extending at least partially along a radial height of the sipe.

In a fourth aspect, the present invention is directed to a tire comprising a circumferential tread portion having a plurality of tread blocks, wherein at least one tread block of the plurality of tread blocks comprises at least one laterally elongated sipe having a pair of laterally extending opposite sidewalls, and wherein a first sidewall of the pair of sidewalls comprises a bump stop protruding into the sipe towards an opposite sidewall of the pair of sidewalls and extending along a radial direction of the sipe so as to avoid closing of the sipe adjacent the bump stop due to forces transversal to the laterally elongated sipe.

BRIEF DESCRIPTION OF THE DRAWINGS

The invention will be described by way of example and with reference to the accompanying drawings in which.

Figure 5:
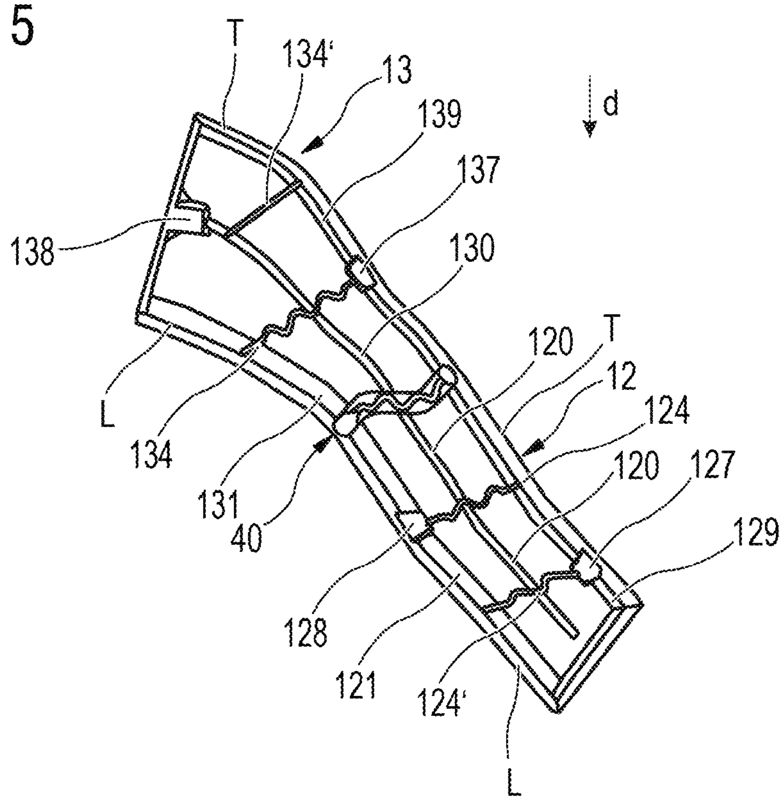
FIG. 5 is a schematic perspective view of adjacent center and intermediate tread blocks of the tread portion shown in FIGS. 1 and 2.
Figure 6:
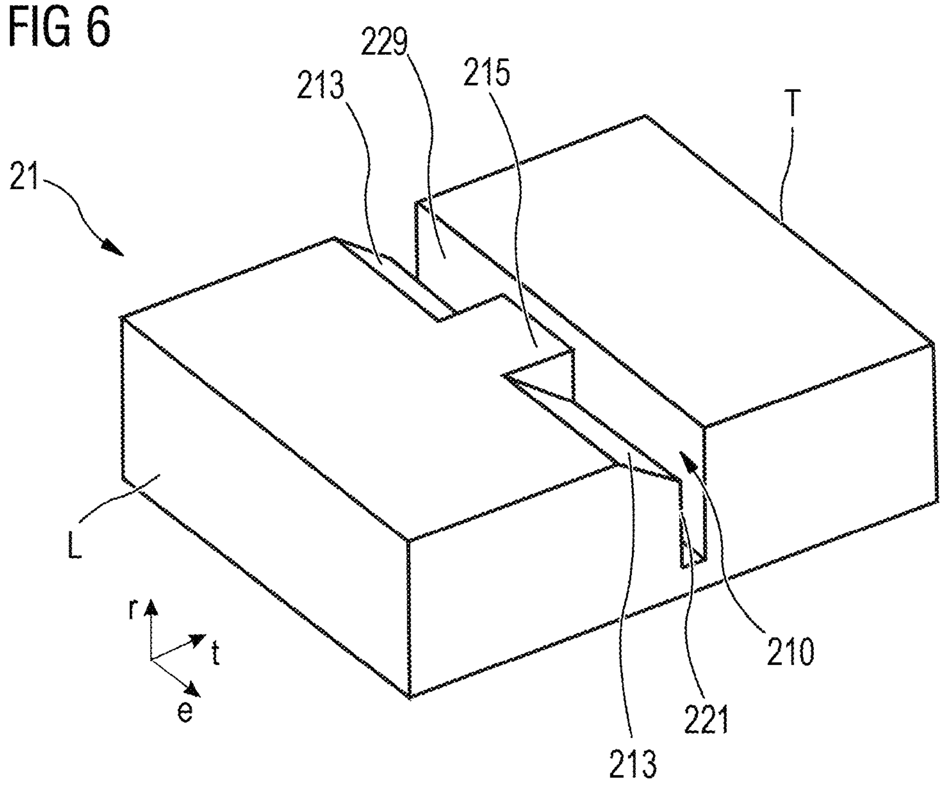
Figure 7:
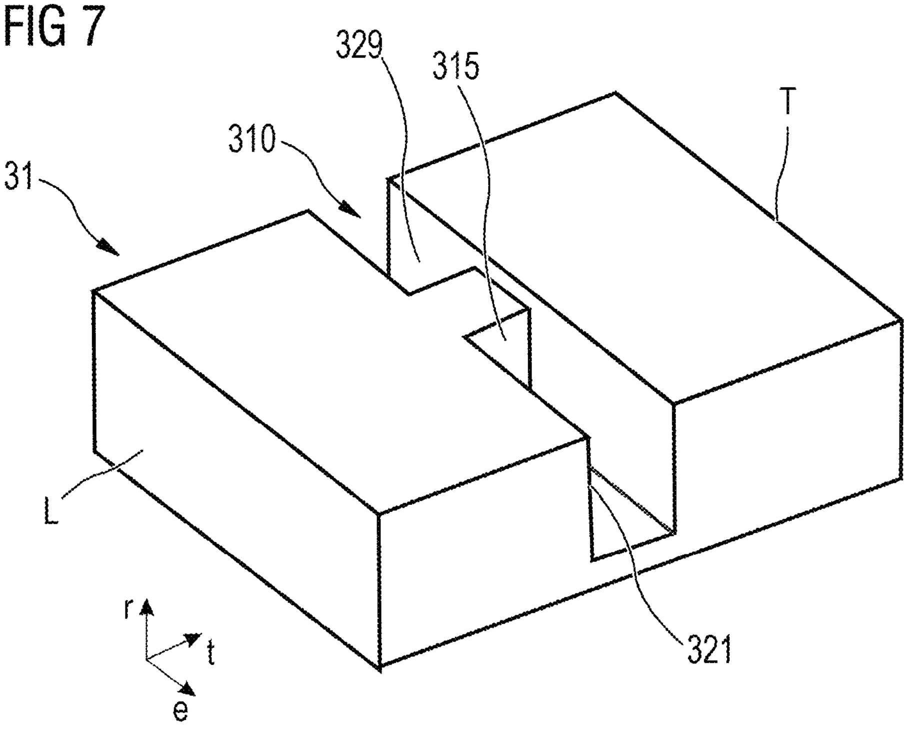
Figure 8:
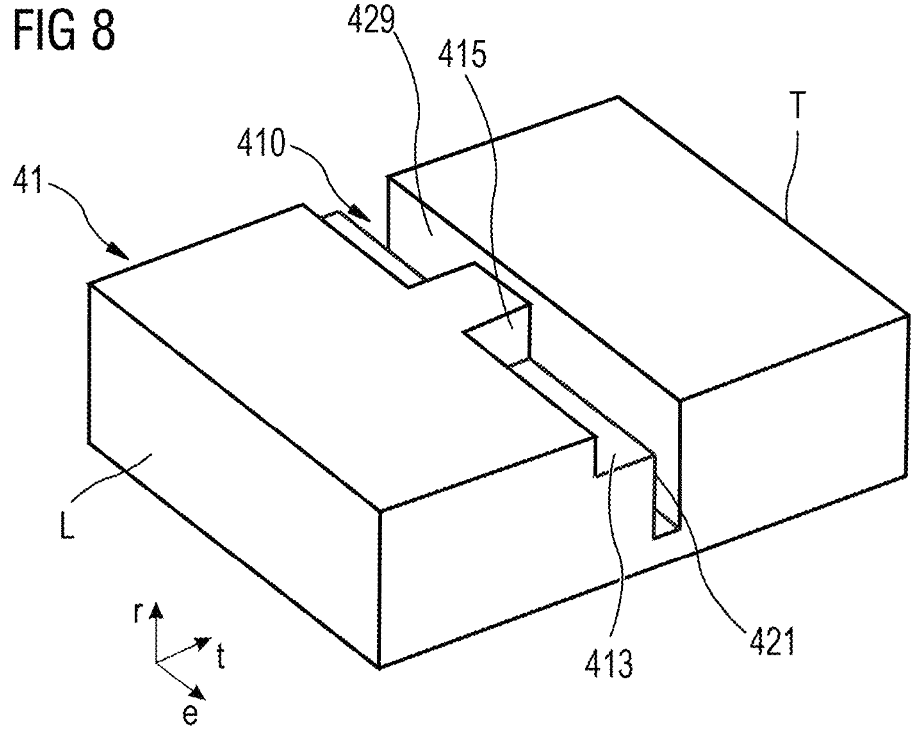
Figure 9:
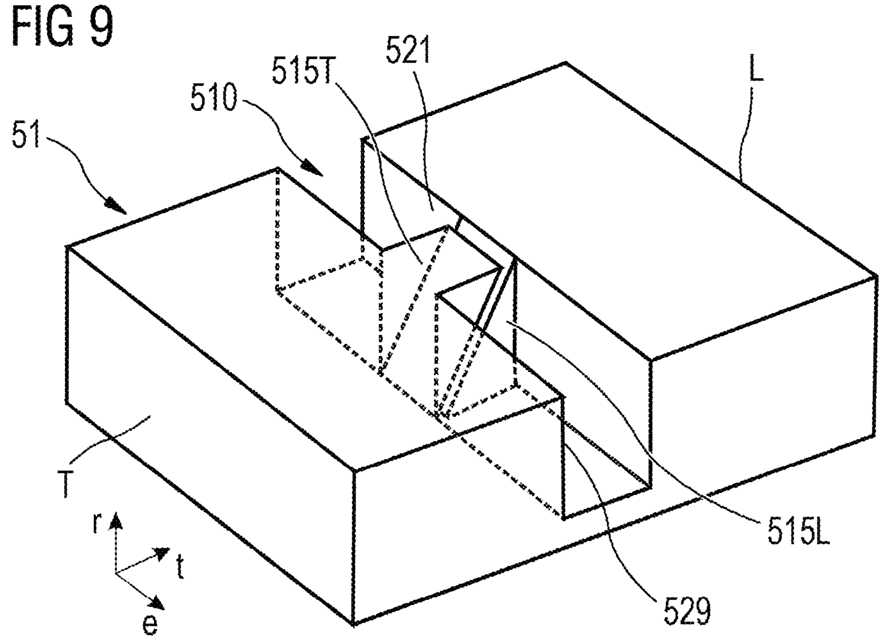
Figure 9A:
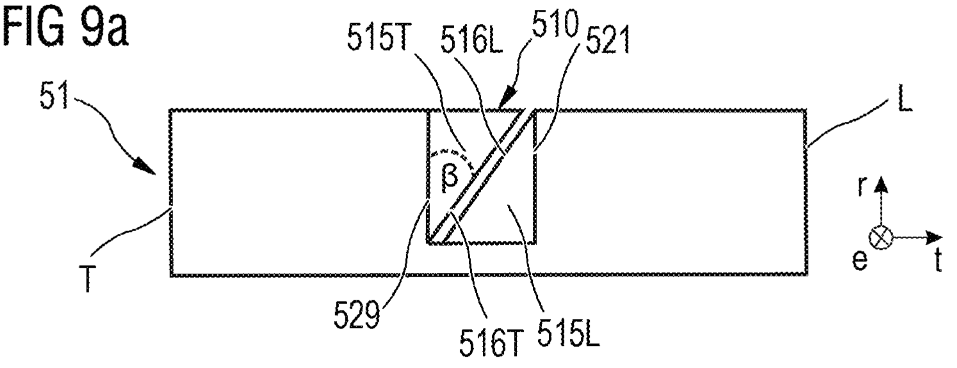
Figure 9B:
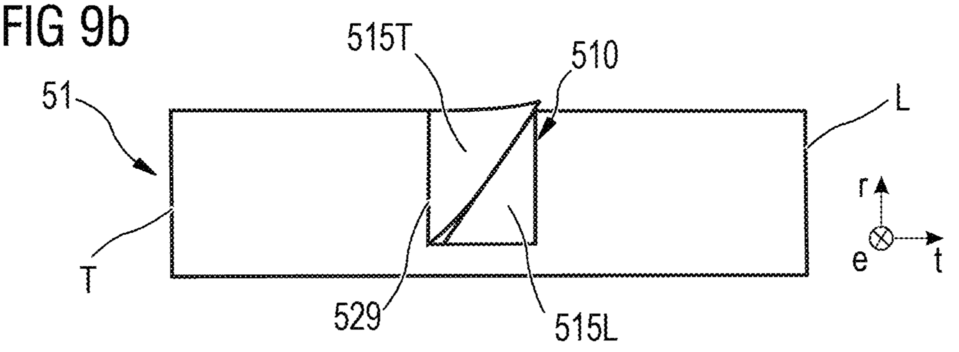
Figure 10:
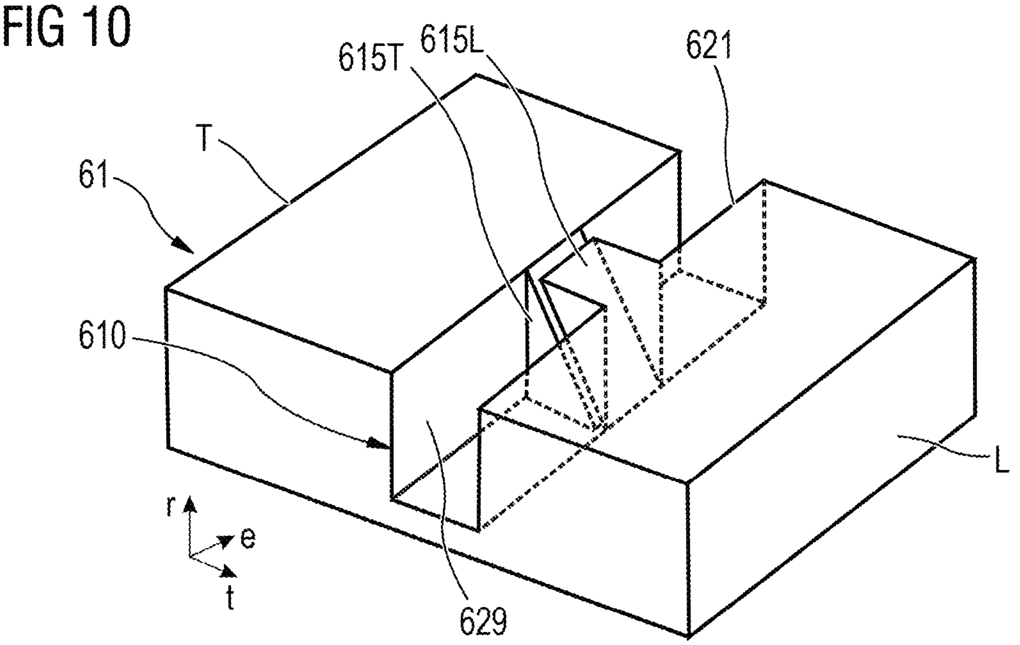
Figure 10A:
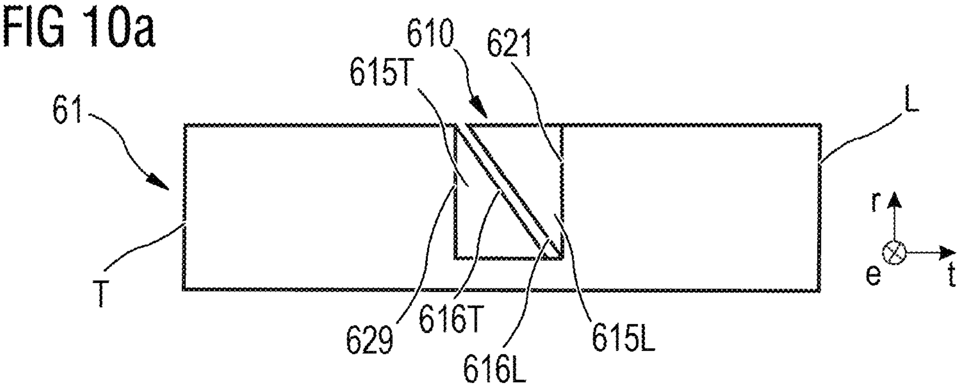
Figure 10B:
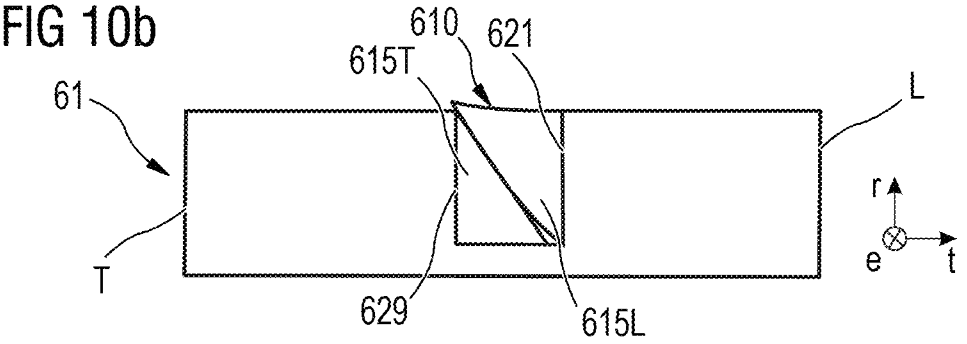

FIG. **5*a* is a schematic partial enlarged perspective view of a transversal sipe of the center tread block shown in FIG. 5**;

FIG. **5*b* is a schematic partial enlarged perspective view of the groove between the intermediate tread block and the center tread block shown in FIG. 5**;

FIG. **5*c*** is a schematic perspective view of adjacent center and intermediate tread blocks, including another embodiment of an intermediate tread block having a treadwear gauge;

FIG. 6 is a schematic perspective view of another tread block comprising an elongated sipe having a radially outer chamfered edge and a bump stop, in accordance with another embodiment of the present invention;

FIG. **6*a* is a schematic side view of the tread block shown in FIG. 6**;

FIG. 7 is a schematic perspective view of yet another tread block comprising an elongated sipe having a column-shaped bump stop, in accordance with yet another embodiment of the present invention;

FIG. **7*a* is a schematic side view of the tread block shown in FIG. 7**;

FIG. 8 is a schematic perspective view of still another tread block comprising an elongated stepped sipe having a bump stop, in accordance with still another embodiment of the present invention;

FIG. **8*a* is a schematic side view of the tread block shown in FIG. 8**;

FIG. 9 is a schematic perspective view of still another tread block comprising an elongated sipe comprising a pair of opposite and wedge-shaped bump stops, in accordance with still another embodiment of the present invention;

FIG. 9*a* is a schematic side view of the tread block shown in FIG. 9;

FIG. 9*b* is a schematic side view of the tread block shown in FIGS. 9 and 9*a* under acceleration of the tire;

FIG. 10 is a schematic perspective view of still another tread block comprising an elongated sipe with a pair of opposite, wedge-shaped bump stops, which have an opposite orientation compared with the embodiment of FIG. 9, also in accordance with still another embodiment of the present invention;

FIG. 10*a* is a schematic side view of the tread block shown in FIG. 10; and FIG. 10*b* is a schematic side view of the tread block shown in FIGS. 10 and 10*a* under a braking maneuver.

DETAILED DESCRIPTION OF THE INVENTION

According to the first aspect, the invention is directed to a tire comprising a circumferential tread portion having two axially opposite circumferential shoulder regions, a circumferential center region provided axially between the shoulder regions, a plurality of tread blocks arranged in a V-shaped pattern, and a plurality of lateral grooves which extend from a respective shoulder region to the circumferential center region. Furthermore, at least one of the tread blocks comprises at least one laterally elongated sipe having a pair of laterally extending opposite sidewalls, wherein a first sidewall of the pair of sidewalls comprises a bump stop protruding into the sipe towards an opposite sidewall of the pair of sidewalls and extending along a radial direction (or height) of the sipe to avoid closing of the sipe adjacent the bump stop due to forces transversal to the laterally elongated sipe.

Thus, the provision of one or more bump stops helps to keep a sipe functional and/or open, e.g., for receiving snow upon rotation of the tire on the road. In particular, avoiding, or at least reducing, closing of the sipes helps to improve winter performance of the tire, particularly snow grip. Moreover, such a bump stop is not connecting (or, in other words, integrally connecting) both opposite sidewalls of the sipe such as tie bars or bridging portions of tread blocks. While such tie bars, or bridging portions, may help to keep a sipe open, they may impair the intended function of the sipe, particularly at the sipe's radially outer edges. In contrast, sidewalls and/or sidewall edges of a sipe having said bump stop can function independently, e.g., by providing better sidewall edge pressure and/or snow scratching. Moreover, tie bars or bridging portions integrally connecting opposite sides of sipes typically result in an increased rolling resistance, when a tire passes its footprint area upon rotation of the tire on the ground. In contrast, the bump stops typically do not deform as much as tie bars or bridging portions upon passing the footprint area of the tire. In addition, a V-shaped tread pattern helps to provide an improved water and slush evacuation, and/or also helps to provide a stable dynamic footprint of the tire, thereby providing an advanced winter performance. Furthermore, (continuous) lateral edges of the V-shaped tread pattern also help to improve snow acceleration and/or braking.

In one embodiment, the tread portion comprises in each of the shoulder regions a circumferential row of shoulder tread blocks, and (preferably in the center region) two axially adjacent circumferential rows of center tread blocks which are meshing along a circumferential centerline of the tread portion so as to form a zig-zag center groove along the circumferential centerline of the tire. Such a zig-zag center groove helps to provide additional snow grip, particularly compared with a center groove extending linearly along the circumferential direction.

In another embodiment, the bump stop has a lateral width within a range of 1 mm to 4 mm. Such a lateral width provides a good compromise between supporting the sipe against closure and open lateral sipe length for receiving snow and improving snow traction.

In still another embodiment, the bump stop has a lateral width within a range of 1 mm to 3 mm along its entire protrusion into the sipe, and/or towards the opposite sidewall.

In still another embodiment, a leading sidewall of the of the pair of sidewalls comprises a chamfer along its lateral extension at a radially outer side of its respective tread block, and wherein the bump stop is optionally provided at the leading sidewall. Preferably, the bump stop extends from a radially outermost surface of the tread block towards a radially innermost end (or end portion) of the chamfer. Such an embodiment helps snow entering the sipe such that snow can be scratched even more easily. Preferably, a trailing sidewall of the pair of sidewalls extends essentially linearly along a radial height of the sipe so that snow scratching can be even further improved.

In one embodiment, said chamfer has an angle (or chamfer angle) with the radial direction within a range of 110° to 160°. In other words, the chamfer protrudes with the chamfer angle in a radially inner direction.

In still another embodiment, the tread portion comprises in each of the shoulder regions a circumferential row of laterally elongated shoulder tread blocks, wherein the at least one tread block of the elongated shoulder tread blocks preferably comprises the elongated sipe. Thus, said sipe comprising said bump stop is preferably provided in a shoulder tread block to improve winter performance.

In still another embodiment, the sipe has a leading sidewall and a trailing sidewall with respect to a direction of rotation of the tire, and the trailing sidewall extends essentially linearly along its radial height. Preferably, the leading sidewall comprises the bump stop and/or a chamfered radially outer edge, or radially outer leading edge. As mentioned above, such a feature helps to improve snow scratching and thus snow grip.

In still another embodiment, the bump stop protrudes over one or more of i) more than 50% of a maximum width of the sipe (e.g., from 55% to 90%, or to 80%, of a maximum width of the sipe). A maximum width, and/or transversal width, of a sipe is determined in a direction perpendicular to the elongated direction and perpendicular to the radial direction, or equivalent. A (maximum) radial height of a sipe is measured in the radial direction, such as between a bottom of the sipe and a radially outermost surface and/or edge of the sipe.

In still another embodiment, the elongated sipe comprises a first bump stop and a second bump stop, wherein, optionally, a lateral distance between the first bump stop and the second bump stop is at least 20% of the total lateral length of the sipe, and/or at least 1 cm. Thus, the number of bump stops is preferably limited in accordance with the above distance so as to obtain a good compromise of sipe space for receiving snow and sipe support for keeping the sipe open and/or functional.

In still another embodiment, said sipe is open at an axially inner end region (of the tread block), and wherein, optionally, the first bump stop is provided in the axially inner end region. Thus, the bump stop can support the sipe at its open end region. It is not rigidly connected with an opposite sidewall along its radial extension. In addition, the sipe still allows drainage of water and/or slush. A decoupling of the opposite sipe sidewalls can also have a positive impact on rolling resistance. It is also possible to mention that said sipe is open at an axially inner face side of the respective tread block, and/or that the first bump stop is provided (preferably in a region) adjacent the axially inner face side of the tread block.

In still another embodiment, the tread block comprises another (and/or second) sipe transversally crossing the elongated sipe (and/or first sipe) in a crossing region between its axially inner end region (or face side of the tread block) and its axially outer end region. Preferably, the second bump stop is provided adjacent the crossing region, and/or less than 3 mm, preferably less than 2 mm or 1 mm, away from said another/second sipe in the crossing region. For instance, this bump stop helps to keep the elongated sipe functional/open adjacent the crossing region, particularly, where the tread block may be less stiff in view of the crossing sipes. Moreover, the second sipe further helps to increase lateral snow traction. Optionally, the second sipe has a smaller radial height than the elongated sipe providing it with a relatively stable shape, even in the absence of one or more bump stops.

In still another embodiment the bump stop is a radially elongated bump stop, preferably extending along a majority of a radial height of the sipe and/or protruding towards another opposite sidewall of the sidewalls.

In still another embodiment, the bump stop extends from a radially outermost edge of the at least one sidewall along the majority of the radial height of the sipe, preferably along at least 80% of, or at least 90% of, or 100% of the radial height of the sipe. In particular, the term majority of shall also comprise all of, unless indicated otherwise herein.

In still another embodiment, a bump stop has an aspect ratio of its radial height to one of i) its width along the elongated direction and ii) its width perpendicular to the elongated direction, within a range of 4 to 20, preferably 6 to 15. In one example such a ratio is at about 10.

In still another embodiment, the sipe has from 2 to 5 bump stops. Optionally, these bump stops are spaced apart from one another and/or extend essentially in parallel to one another.

In still another embodiment, a sum of widths (measured along the elongated direction) of the bump stops is less than 20%, preferably less than 15%, of the total extension of the laterally elongated sipe.

In still another embodiment, the first sidewall is a leading sidewall and the second sidewall is a trailing sidewall, wherein the leading sidewall comprises said bump stop, and/or wherein the leading sidewall comprises a chamfer, or chamfered edge, at a radially outer side of the tread block. The chamfer optionally has an angle within a range of 110° to 160° with the radial direction of the tire. In other words, the chamfer protrudes with the chamfer angle in a radially inner direction and/or towards the opposite sidewall. For instance, the (transversal) width of the sipe decreases in a radially inner direction between a chamfered edge and the opposite sidewall.

In still another embodiment, the bump stop has a face side, which is one or more of i) flat, ii) planar, iii) rectangular, iv) spaced apart from the opposite sidewall, and v) extending essentially in parallel to the opposite sidewall.

According to the second aspect, a tire comprises a circumferential tread portion having tread blocks, wherein at least one of the tread blocks comprises at least one laterally elongated (and/or extending) sipe having a pair of laterally extending opposite sidewalls, and at least one pair of bump stops. Furthermore, a first sidewall of the pair of sidewalls comprises a first bump stop of the pair of bump stops, which protrudes into the sipe towards an opposite and/or second sidewall of the pair of sidewalls. Moreover, the second sidewall of the pair of sidewalls comprises a second bump stop of the pair of bump stops, which protrudes into the sipe towards the first sidewall of the pair of sidewalls. Still in accordance with the second aspect, the first bump stop comprises a first wedged shape increasing in thickness (determined perpendicular to the laterally elongated sipe) from a radially outer portion of the sipe towards a radially inner bottom of the sipe, and the second bump stop comprises a second wedged shape increasing in thickness (determined perpendicular to the laterally elongated sipe) from the radially inner bottom of the sipe towards a radially outer portion of the sipe, wherein the first bump stop and the second bump stop face each other.

On the one hand, such a sipe comprising said pair of bump stops helps to prevent closing of the laterally elongated sipe when the tire rotates on the ground and/or passes the footprint of the tire. Keeping the sipe open means that the sipe is kept functional to receive snow, thereby improving snow grip and winter performance. On the other hand, the two oppositely wedged bump stops can help to support traction and/or braking (such as depending on which sidewall is the leading sidewall upon rotation of the tire). In particular, under tire acceleration or braking, the wedged shapes result in one of the bump stops of the pair of bump stops protruding in a radially outer direction, which further improves snow scratching. Furthermore, while both bump stops face each other, they are not integrally connected to each other such as tie bars or bridging portions of tread blocks. While tie bars or bridging portions may help to keep a sipe open, they may impair the function of the leading and trailing sidewalls, or sidewall edges of the sipe, and may reduce their edge pressures and/or impair snow scratching properties. Moreover, tie bars or bridging portions may impair rolling resistance, contrary to the present solution.

In one embodiment, the first bump stop has a first face side which is ramped from the radially outer portion to the radially inner bottom of the sipe, and the second bump stop has a second face side which is oppositely ramped, and/or ramped from the radially inner bottom of the sipe to the radially outer portion. Optionally, the first face side and the second face side are one or more of i) flat, ii) planar, iii) spaced apart from each other, and iv) extending essentially in parallel to each other. In addition, or alternatively, both face sides may be rectangular.

In another embodiment, the first face side and the second face side have a distance between each other which is within a range of 0.1 mm to 2.5 mm, preferably of 0.1 mm to 1.5 mm, or 0.2 mm to 1.1 mm, or 0.3 to 0.6 mm, determined perpendicular to the face sides. Thus, both facing bump stops can effectively support the open sipe but are still decoupled from each other.

In still another embodiment, an angle of one or both of the face sides with the radial direction of the tire is within a range of 20° to 65°, preferably within a range of 25° to 50°, or from 30° to 40°.

In still another embodiment, one or more of the first bump stop and the second bump stop have a lateral width within a range of 1 mm to 4 mm.

In still another embodiment, the sipe has from 1 to 3 pairs of bump stops along its elongated extension.

In still another embodiment, a lateral distance between two laterally neighboring pairs of bump stops is one or more of i) at least 1 cm, ii) at least 4 times a lateral width of the laterally largest one of the bump stops.

According to the third aspect, a tire comprises a circumferential tread portion having two axially opposite circumferential shoulder regions, a circumferential center region provided axially between the shoulder regions, tread blocks arranged in a V-shaped pattern (e.g., circumferentially around the tire), lateral grooves which extend from a respective shoulder region to the circumferential center region. A plurality (such as a majority) of the tread blocks comprise one or more of chamfered leading edges and chamfered trailing edges (preferably both), and wherein, for a plurality (such as a majority) of the tread blocks, each tread block comprises a first sipe extending in a lateral direction and a second sipe, extending transversally to the first sipe. Furthermore, at least one of the tread blocks comprising the second sipe comprises a notch at a transversal end of the second sipe and at one of the chamfered leading edges and chamfered trailing edges, wherein the notch is (preferably at least 10%, or at least 20%) laterally broader and (preferably at least 10%, or at least 20%) radially deeper than the second sipe. Still in accordance with the third aspect, at least one of the tread blocks comprises at least one laterally elongated sipe having a pair of laterally extending opposite sidewalls, and wherein a first sidewall of the pair of sidewalls optionally comprises a bump stop protruding into the sipe towards an opposite and/or second sidewall of the pair of sidewalls and extending at least partially along a radial height of the sipe.

Thus, such a tire, which is preferably a pneumatic tire, comprises an advanced tread portion for winter conditions. For instance, the V-shaped tread block pattern helps to improve evacuation of water and particularly of slush. Furthermore, lateral tread block edges of a V-shaped pattern can also aid in snow traction and/or acceleration and braking. Said chamfered tread block edges help to improve traction on snow as snow can enter adjacent grooves easier in the footprint. Moreover, snow deformation in front of such a chamfered tread block has been found to be higher. In addition, block chamfers reduce the surface area of the respective tread block and increase surface pressure for improved breaking and handling, such as on non-dry ground. Another positive effect of chamfers at the tread block edges consists in an improvement of tread block contact, such as via reduced deformation and/or folding. Furthermore, said transversal second sipes provided in addition to lateral sipes help to improve lateral snow traction and/or handling. The provision of said notches helps to provide snow traction also upon wear of the tread portion and provides a more homogeneous block stiffness upon tread wear, which also helps to provide more homogenous snow traction and winter handling properties. Moreover, said bump stops can support an improved snow traction by helping to keep the respective sipe open, without increasing tread block stiffness. In summary, an advanced winter performance can be provided.

In one embodiment, the second sipe extends transversally through the tread block with a zig-zag shape or, in other words, with a zig-zag path. Such an arrangement helps to further improve snow traction in circumferential and lateral directions. In particular, a circumferential and/or linearly extending groove is less preferred in the present embodiment. In addition, or alternatively, the tire and/or its tread portion is devoid of grooves which extend linearly in the circumferential direction, such as along the entire circumference of the tire.

In another embodiment, a plurality of tread blocks (or shoulder tread blocks) in the shoulder regions of the tire comprise laterally extending sipes having a leading sidewall with a chamfered edge at a radially outer surface of the respective tread block. Such sipes may also be described as having a pair of sidewalls having opposite first and second sidewalls, wherein one sidewall of the pair of sidewalls is a leading sidewall and another sidewall of the pair of sidewalls is a trailing sidewall, particularly with respect to a direction of rotation of the tire. Preferably, the tire may be described as a directional tire, i.e., having a defined direction of rotation, such as optionally indicated on a sidewall of the tire, and/or resulting from the V-shaped tread pattern pointing into the defined direction of rotation of the tire.

In still another embodiment, the tread portion comprises transversal grooves which extend transversally to the lateral grooves and delimit laterally adjacent tread blocks, wherein at least one transversal groove of the transversal grooves comprises a zig-zag portion extending along the transversal groove and a transversally extending bottom portion, which is provided radially below the zig-zag portion, and wherein a width of the transversal groove is larger in the bottom portion than in the zig-zag portion. The width of the groove can be determined perpendicular to its extension. In particular, the zig-zag portion helps to lock the groove together, such as for an improved lateral and longitudinal stiffness. The larger bottom portion can compensate for reduced void volume as the tire tread wears. For instance, this may help to receive sufficient snow, and/or efficiently evacuate water and/or slush, helping again to provide an advanced winter performance of the tire. Optionally, lateral grooves can be described as delimiting transversally and/or circumferentially neighboring tread blocks.

In still another embodiment, one or more of said tread block chamfers have a radial height within a range of 0.5 mm to 4 mm, and/or a transversal width within a range of 0.5 mm and 4 mm. Preferably, at a leading edge of a tread block, one or more of said tread block chamfers have a radial height within a range of 1 mm to 4 mm, and/or a transversal width within a range of 1 mm and 3 mm. Preferably, the width is at least 0.5 mm smaller than the height. In additional, or alternatively, at a trailing edge of a tread block, one or more of said tread block chamfers have a radial height within a range of 0.5 mm to 2 mm, and/or a transversal width within a range of 0.5 mm and 2 mm. Preferably, at least one of the width and the height of the chamfers at the trailing edge (even more preferably both of them) are at least 0.5 mm, and/or at least 20%, smaller than the respective one of the width and the height of the chamfers at the leading edge of the tread block.

According to said fourth aspect, a tire comprises a circumferential tread portion having tread blocks, wherein at least one tread block of the tread blocks comprises at least one laterally elongated sipe having a pair of laterally extending opposite sidewalls, and wherein a first sidewall of the pair of sidewalls comprises a bump stop protruding into the sipe towards an opposite sidewall of the pair of sidewalls and extending along a radial direction of the sipe, so as to avoid closing of the sipe adjacent the bump stop due to forces transversal to the laterally elongated sipe.

As already mentioned in relation to the first aspect, the bump stop helps to keep the sipe open and allows snow to enter the sipe, which helps to provide improved snow traction. Further above-mentioned effects of the bump stop, or respective embodiments, may apply to the fourth aspect and its embodiments as well.

In one embodiment, the bump stop extends from a radially outer side of the tread block at least over 20% (preferably at least over 25%) of the maximum radial depth of the sipe, and/or has one or more of a) a lateral width within a range of 1 mm to 4 mm, b) one or more of a flat, rectangular, and planar face side, and c) a face side extending in parallel to the opposite sidewall.

In another embodiment, the sipe comprises a chamfer extending along the elongated sipe at the radially outer side of the tread block and preferably at a leading sidewall of the sipe.

In still another embodiment, the bump stop is provided at the leading sidewall of the sipe and preferably extends over one or more of: i) a, preferably entire, radial height of the chamfer, ii) a, preferably entire, transversal width of the chamfer, and ii) a radial height of 0.5 mm to 5 mm.

Figure 1:
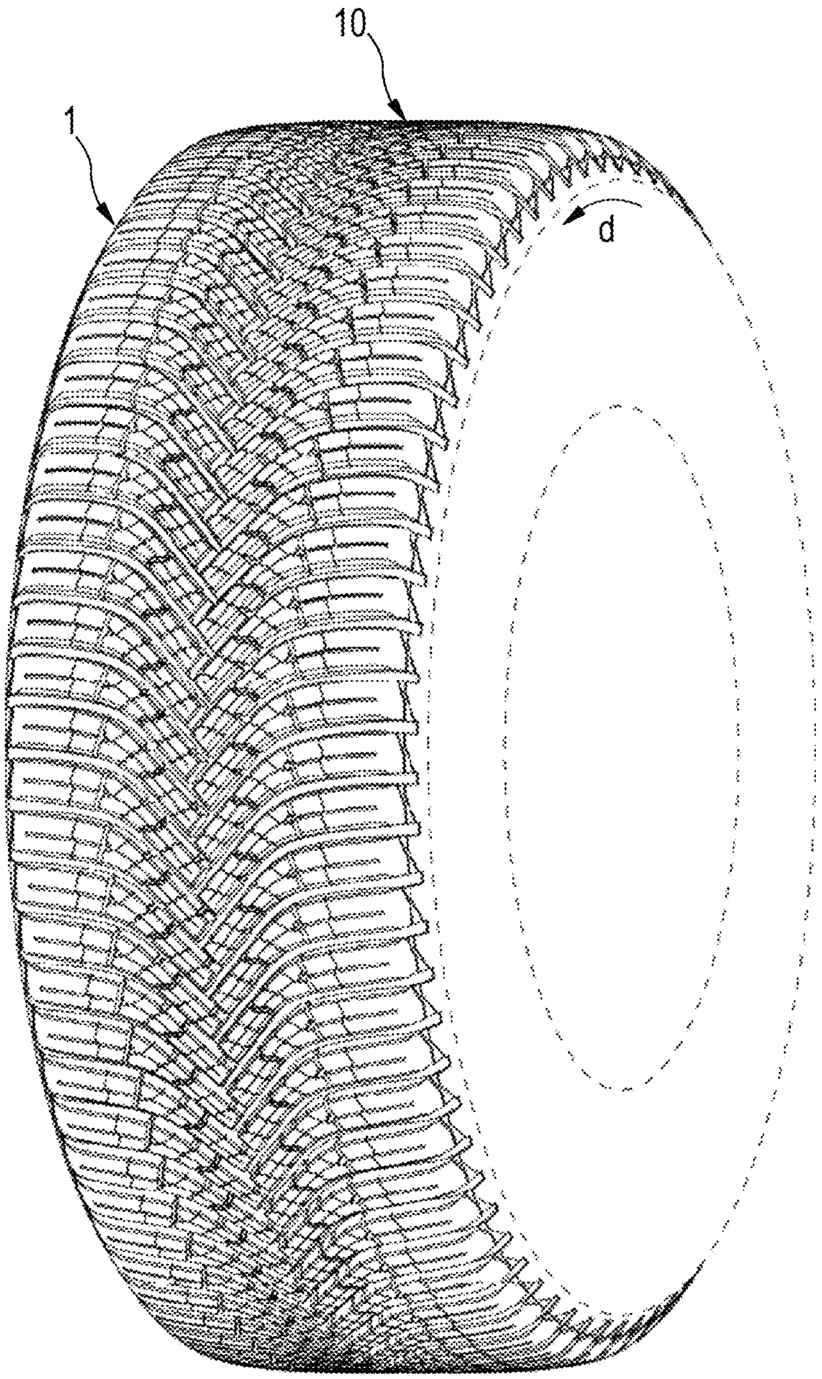
FIG. 1 is a schematic partial perspective view of a pneumatic tire comprising a circumferential tread portion in accordance with an embodiment of the present invention.

FIG. 1 schematically shows a pneumatic tire 1 comprising a circumferential tread portion 10. In the present non-limiting embodiment, tire 1 is a winter tire or all-season passenger car tire. The tread portion 10 comprises tread blocks which are arranged in a V-shaped tread pattern. In particular, tire 1 has a defined direction of rotation d, or is, in other words, a directional tire 1. A defined and/or preferred direction of rotation may typically be indicated on a sidewall of the tire (not explicitly shown in FIG. 1).

Figure 2:
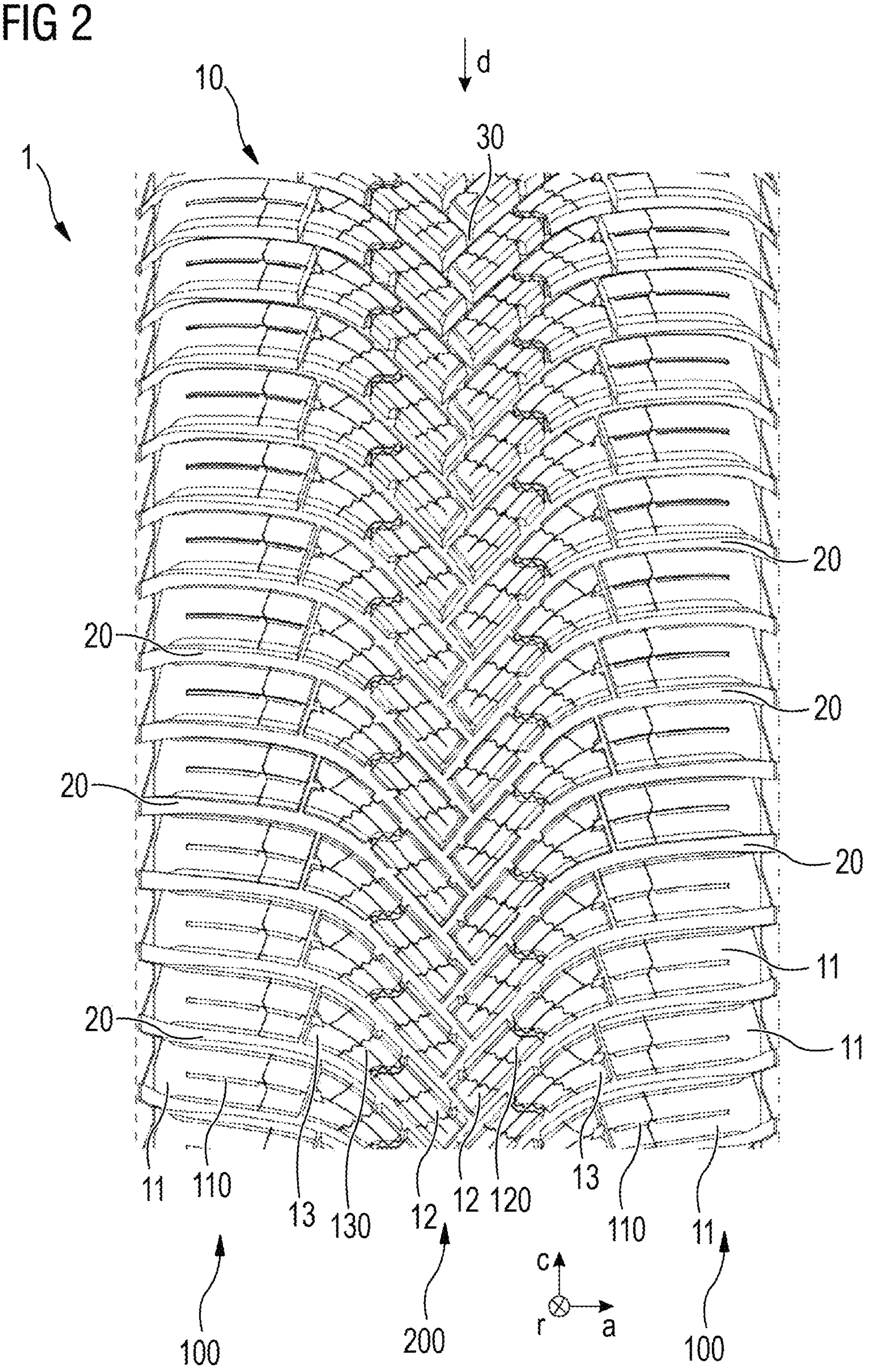
FIG. 2 is a schematic top view of a part of the tread portion of the tire shown already in FIG. 1.

The tread pattern of the tread portion 10 of tire 1 is described in further details with respect to FIG. 2. As shown in the schematic and partial top view of FIG. 2, the tread portion 10 of the tire 1 comprises two axially outer circumferential shoulder regions 100 and a circumferential center region 200 which is arranged axially between both circumferential shoulder regions 100. In each of the circumferential shoulder regions 100, the tread portion 10 comprises a circumferential row of shoulder tread blocks 11, which are (circumferentially) delimited by lateral grooves 20. A lateral direction of the tread portion 10 and/or tire 1 can be considered as being transverse to the circumferential direction c of the tire 1. Axially between the two axially outer and/or axially opposite rows of shoulder tread blocks 11, the tread portion 10 comprises two meshing circumferential rows of center tread blocks 12 which form a circumferential zig-zag groove 30 (or, in other words, a serrated groove) along a circumferential centerline of the tread portion 10. Two laterally adjacent and/or neighboring center tread blocks 12 can be considered as forming together a tip portion of said V-shape, pointing into the direction of rotation d of the tire 1.

Laterally between each shoulder tread block 11 and a laterally adjacent center tread block 12, an intermediate tread block 13 of a circumferential row of intermediate tread blocks 13 is provided. In the present embodiment, each tread block 11, 12, 13 comprises at least one respective lateral sipe 110, 120, 130, which extends essentially along a laterally elongated shape of the respective tread block 11, 12, 13, and/or one of its laterally elongated edges. Such sipes 110, 120, 130, sometimes also referred to as snow sipes, help to improve snow grip of the tire 1. Tread blocks 11, 12, 13, including their laterally elongated sipes 110, 120, 130, of the tread portion 10 are further described with respect to the following Figures.

The axial direction a, the radial direction r, and the circumferential direction c are indicated in FIG. 2 and in further Figures shown and described herein below. The axial direction a is parallel to the axis of rotation of the tire 1. The radial direction r is perpendicular to the axial direction a. Furthermore, the circumferential direction c is parallel to an equatorial plane (not explicitly shown) of the tire 1 and perpendicular to the axial direction a, as well as to the radial direction r. A reference to one of these directions is not necessarily limited to a certain orientation of such a direction, unless indicated otherwise herein.

Figure 3:
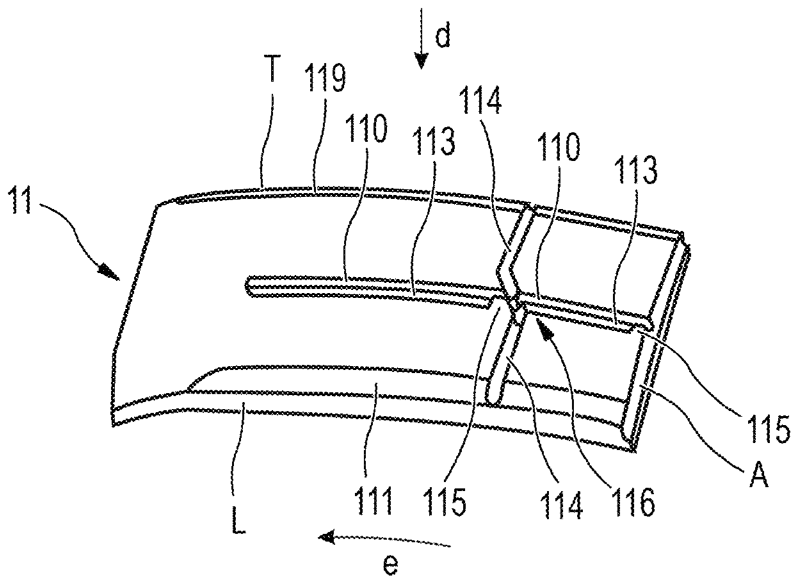
FIG. 3 is a schematic perspective view of a shoulder tread block of the tread portion shown in FIGS. 1 and 2.

FIG. 3 shows a schematic enlarged perspective view of a shoulder tread block 11 such as already mentioned above in relation to FIG. 2. The shoulder tread block 11 has a laterally elongated shape, wherein a direction of elongation e is indicated for the sake of convenience. In particular, the shoulder tread block 11 has a leading edge L and a trailing edge T with respect to the direction of rotation d of the tire, wherein the leading edge L and the trailing edge T extend along the direction of elongation e (which is curved in the present non-limiting example but could be straight in other embodiments). For instance, an aspect ratio of the tread shoulder block 11 of elongated length to its transversal width (essentially perpendicular to its laterally elongated length) is within a range of 1.5 to 4, preferably 2 to 3, or 2 to 2.5. Furthermore, the shoulder tread block 11 comprises the lateral sipe 110 which preferably extends essentially in parallel to the leading edge L and/or the trailing edge T of the shoulder tread block 11. Preferably, the elongated sipe 110 is open at an axially inner edge or face side A of the shoulder tread block 11 and may extend over more than 50%, or preferably over more than 70%, of the elongated length of the shoulder tread block 11. The transversal width of the sipe 110 (measured perpendicularly to the elongated length of the sipe 110) is preferably within a range of 0.5 mm to 3.5 mm, or preferably to 3 mm, or only to 2 mm.

In the present embodiment, the shoulder tread block 11 comprises at its leading edge L, in a radially outer portion, a tread block chamfer 111. Such a tread block chamfer 111 helps snow to enter the adjacent lateral groove delimiting the tread block 110 and deforms snow in front of the shoulder tread block 11. Similarly, the tread block 11 comprises a tread block chamfer 119 at a radially outer portion of its trailing edge T, which also helps snow to enter the circumferentially adjacent lateral groove. In addition to both tread block chamfers 111, 119 provided at said tread block edges, the sipe 110 also comprises a (sipe) chamfer 113 at a radially outer portion of the sipe 110, particularly at a leading sidewall of the sipe 110. Upon rotation of the tire on the ground, snow may enter the sipe more easily via the chamfer 113 of the sipe 110 and can be blocked, or scratched, by an opposite trailing sidewall of the sipe 110 so as to improve snow grip.

In order to further improve snow grip, the shoulder tread block 11 also comprises a transversal sipe 114, which extends transversally to the laterally elongated sipe 110 and/or the elongated direction e (which can be interchangeably mentioned as direction of elongation e herein). In particular, the transversal sipe 114 crosses the sipe 110 in a crossing region 116. Moreover, the transversal sipe 114 preferably extends in a zig-zag shape (or path) so that it can further improve circumferential snow grip and also lateral snow grip. In the present non-limiting embodiment, the crossing region 116 is provided in an axially inner half of the shoulder tread block 110, and/or at an axially inner half of the laterally elongated sipe 110.

For an even further improvement of snow grip, the laterally elongated sipe 110 comprises two bump stops 115 which help to keep the sipe 110 open when the shoulder tread block 11 rotates through a footprint of the tire, or in other words over the ground. For instance, forces acting in the circumferential direction and/or transversally to the laterally elongated sipe 110 may act to close the sipe 110 which would reduce the sipe's efficiency for receiving snow. In this context, the bump stop 115 helps to reduce bending and/or closing of the sipe 110, at least in regions adjacent the respective bump stop 115. In the present embodiment, a bump stop 115 is provided at an axially inner end of the sipe 110 at the axially inner face side A of the shoulder tread block 11, where the sipe 110 has an open end. In the present case, an integral connection or closure, resulting in a bridging portion, of the sipe 110 at its axially inner end is avoided. Similarly, the sipe 110 comprises a second bump stop 115 adjacent the crossing region 116, particularly at an axially outer side of the crossing of the sipes 110 and 114. Again, the respective bump stop 115 helps to reduce closing of the sipe 110 and maintain the sipe's ability to receive snow. In the present embodiment, each bump stop 115 extends to a radially outermost surface of the tread block 11 and protrudes transversally over the width of the sipe's chamfer 113. Similar and further arrangements of bump stops are shown in the embodiments of FIGS. 6 to 10.

Figure 4:
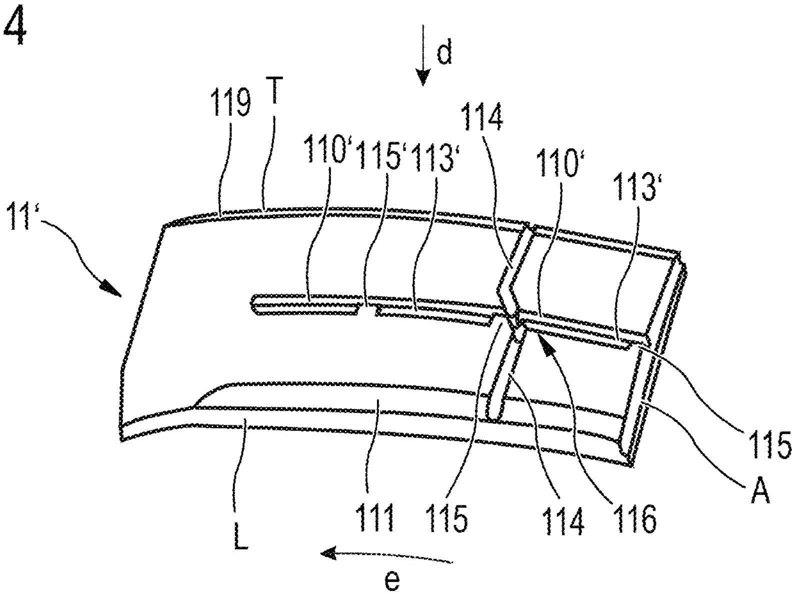
FIG. 4 is a schematic perspective view of a shoulder tread block in accordance with another embodiment of the present invention.

FIG. 4 shows another embodiment of a shoulder tread block 11' which is similar to the embodiment shown in FIG. 3, but which has an additional bump stop 115' arranged in an axially outer half of the sipe 110', transversally protruding into the sipe 110' along the chamfer 113' and from a radially outer surface of the tread block 11'. For the sake of convenience, FIG. 4 utilizes the same reference signs as FIG. 3, where appropriate. The additional bump stop 115' helps to further reduce closing of the sipe due to high forces transversal to the laterally elongated tread block 11'. Preferably, a sipe of a tread block comprises from 1 to 4 bump stops. Each bump stop preferably has a width (along the laterally elongated direction e) within a range of 1 mm to 3 mm, or to 2 mm. All bump stops together preferably have a width along the elongated direction e which is less than 20%, preferably less than 15% of the total elongated length of a sipe. In particular, the number of bump stops is limited to provide still relatively long chamfers along the radially outer top portion of the respective sipe.

FIG. 5 schematically shows two laterally adjacent tread blocks 12 and 13, i.e., a center tread block 12 and an intermediate tread block 13, which are separated by the transversal (tread) groove 40. Each of the tread blocks 12, 13 comprises a leading edge L and a trailing edge T resulting from the direction of rotation d of the directional tire.

Figure 5A:
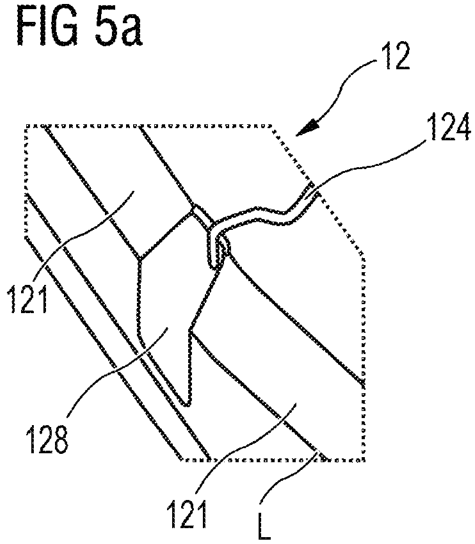

The intermediate tread block 13 comprises a laterally extending sipe 130 which extends essentially in parallel to the leading and trailing edges of the intermediate tread block 13. Optionally, this sipe 130 is less deep than the laterally elongated sipe of the axially adjacent shoulder tread block. In addition, intermediate tread block 13 has a transversal sipe 134, particularly a transversal zig-zag sipe 134, which is preferably deeper than the laterally extending sipe 130 of the intermediate tread block 13. Furthermore, the sipe 134 and/or the intermediate tread block 130 is provided with a notch 137 at one of the transversal ends of the sipe 134, wherein the notch 137 has a larger lateral width and a larger radial depth than the sipe 134. A similar notch is explained in further detail with respect to center tread block 12 and with respect to FIG. 5*a* further below. Moreover, the intermediate tread block 13 comprises a tread block chamfer 131 at a radially outer portion of its leading edge L and a tread block chamfer 139 at a radially outer portion of its trailing edge T. Similar to the tread block chamfers mentioned above in relation to the shoulder tread block, the tread block chamfers 131, 139 of intermediate tread block 13 help snow to enter adjacent lateral grooves of the tread portion and help to deform snow in front of the intermediate tread block 13. Moreover, the trailing tread block chamfer 139 optionally has a smaller transversal width and/or radial height (preferably both) than the leading tread block chamfer 131 of the intermediate tread block 13. These smaller dimensions at the trailing edge T may help to provide better treadwear properties of the tread block 13, while still offering the above-mentioned positive effects of a chamfer. The same may apply to the corresponding chamfers of the shoulder tread block described herein above. For instance, a tread block chamfer at the leading edge L may have a transversal width and/or radial height within a range 1 mm to 4 mm, and/or a tread block chamfer at the trailing edge T may have a transversal width and/or radial height which is at least 20% smaller than the respective value of the tread block chamfer at the leading edge L, and/or may be within a range of 0.5 mm to 2 mm. Furthermore, the intermediate tread block 13 comprises an additional notch 138 at its axially outer side wherein the laterally extending sipe 130 ends and/or opens into this notch 138, at its axially outer end, and wherein the notch 138 is radially deeper and transversally broader than the laterally extending sipe 130. In addition, the intermediate tread block 13 comprises another transversal and linearly extending sipe 134' which extends between the laterally extending sipe 130 and the trailing edge T of the intermediate tread block 13, particularly laterally between said axially outer notch 138 and the transversal zig-zag sipe 134.

The center tread block 12, as shown in FIG. 5, has a laterally extending elongated sipe 120 which is preferably aligned with the laterally elongated sipe 130 of the adjacent intermediate tread block 13. Furthermore, the center tread block 12 comprises two transversally extending sipes 124, 124', wherein the sipe 124 has a zig-zag shape along its transverse extension and ends at its leading end in a notch 128 which has a larger width (in the lateral and/or elongated direction) than the sipe 124 and extends deeper in a radially inner direction than the sipe 124. This portion is further shown in detail in FIG. 5*a*, which schematically shows a part of the leading edge L of the center tread block 12, including its chamfer 121, a portion of the transversal zig-zag sipe 124 and the notch 128. In particular, in a preferred embodiment, the transversal sipe 124 radially extends less deep, or only as deep as the chamfer 121 in a radially inner direction. Upon tread wear, the notch 128 evolves, particularly upon wear of the chamfer 121, so that, on the one hand, the center tread block 12 is provided with an additional aperture to receive snow, and, on the other hand, block stiffness changes less with tread wear.

Referring again to FIG. 5, similar to sipe 124, the transversal sipe 124' also extends with a zig-zag path through the center tread block 12 and ends in a notch 127 (similar to notches 137 and 128) at a trailing edge T of the tread block 12. Furthermore, tread block 12 is also provided with a chamfer 129 at a radially outer portion and/or surface of the tread block 12. In addition, the center tread block 12 also has a chamfer 121 at its opposite leading edge L.

Figure 5B:
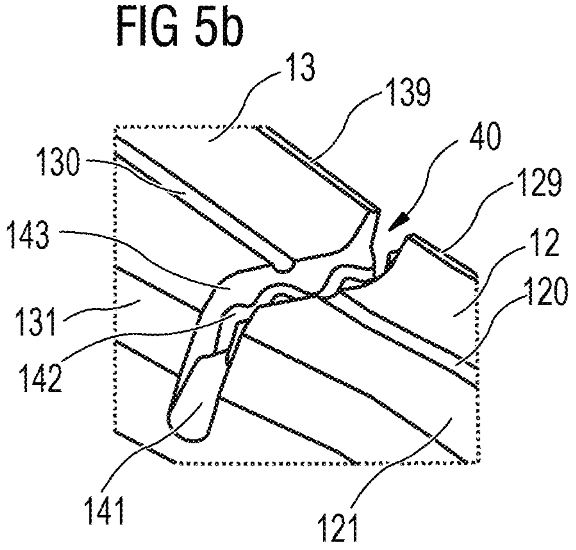

FIG. 5*b* shows a schematic enlarged view of the transversal groove 40 separating the intermediate tread block 13 and the center tread block 12. The corresponding tread block features, such as tread block chamfers 131, 139; 121, 129, as well as the laterally elongated sipes 130, 120 of the laterally neighboring tread blocks 13, 12 are depicted as already shown in FIG. 5. As visible in FIG. 5*b*, the transversal groove 40 is (particularly in its top and bottom portions with respect to the radial direction) significantly broader than the sipes of the tread blocks 12, 13, such as at least 2 times, preferably at least 3 times broader, measured perpendicularly to the extension of the transversal groove 40. In particular, the transversal groove 40 has a radially inner bottom portion 141, a radially outer top portion 143, and a radial intermediate portion 142. Said intermediate portion 142 extends with a zig-zag shape, which is narrower than each of the top portion 143 and the bottom portion 141 of the transversal groove 40. The zig-zag shape of the intermediate portion 142 of said groove 40 locks together upon driving for an improved lateral and longitudinal stiffness. The shape of the transversal groove 40 evolves into a larger notch in the radially inner portion 141, such as to compensate for a reduced void volume as the tire wears. Optionally, the radially outer top portion 143 and/or the radially inner bottom portion 141 has a width, measured perpendicular to the extension of the transversal groove 40, of at least 2 mm, preferably of at least 2.5 mm, or even more preferably of at least 3 mm. Preferably, such a width is at most 6 mm, preferably at most 5 mm, or at most 4 mm. Optionally, the radially outer top portion 143 and/or the radially inner bottom portion 141 may be described to form a channel, e.g., having such widths.

Figure 5C:
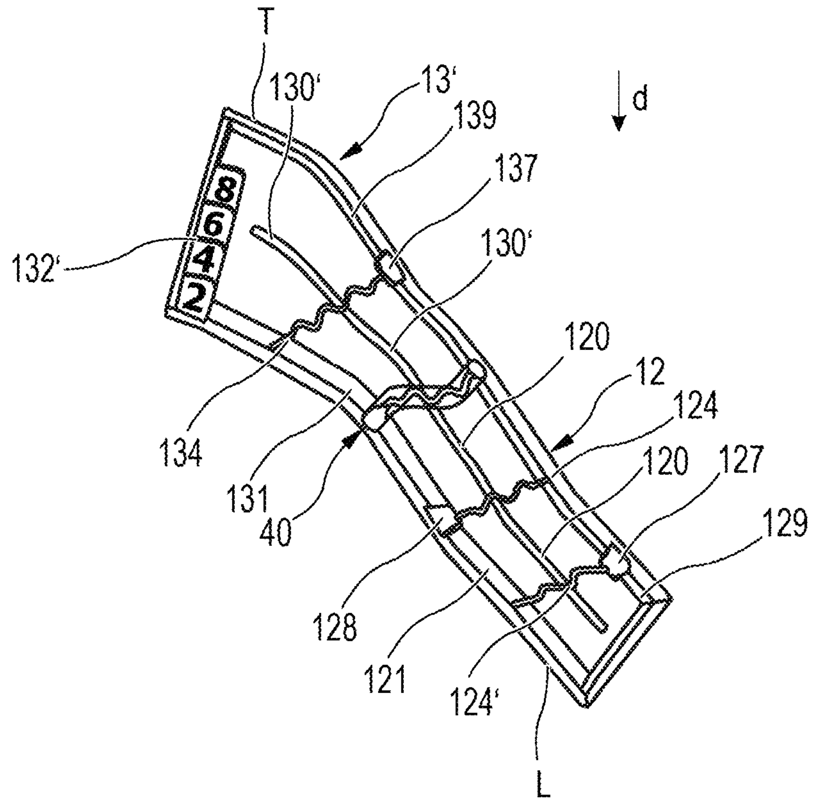

FIG. 5*c* schematically shows a center tread block 12, such as already shown in FIG. 5, and an adjacent intermediate tread block 13', which is similar to the intermediate tread block 13 already shown in FIG. 5 but which has an additional treadwear indicator or gauge 132' and is devoid of a transversal, linearly extending sipe. For the sake of better comprehensibility, the same reference signs are used in FIGS. 5 and 5*c*, where appropriate. In particular, the stepped treadwear indicator or gauge 132', as shown in FIG. 5*c*, provides numbers of a remaining tread depth in millimeters, i.e., here 8 mm, 6 mm, 4 mm, and 2 mm, which are arranged and shown (as radially outward protruding rubber material) in steps of corresponding remaining radial tread depths. For the sake of convenient visual inspection, the treadwear gauge 132' is provided at an axially outer side of the intermediate tread block 13'. In the present, and non-limiting embodiment, the lateral sipe 130' ends with a dead end axially inwards the treadwear gauge 132'. By informing on the wear status of the tire tread, information on potential snow grip is also provided, particularly in case the tire tread is almost completely worn upon use of the tire. For instance, in one embodiment, a tread portion may comprise a plurality of the intermediate tread blocks 13 as shown in FIG. 5 and have some intermediate tread blocks 13' with treadwear gauges as shown in FIG. 5*c* distributed along the circumference of the tire, such as every 3 to 50 intermediate tread blocks along the circumferential direction of the tire. For example, such a number or frequency of intermediate tread blocks 13' may be chosen in view of actual tire sizes and/or diameters.

Figure 6A:
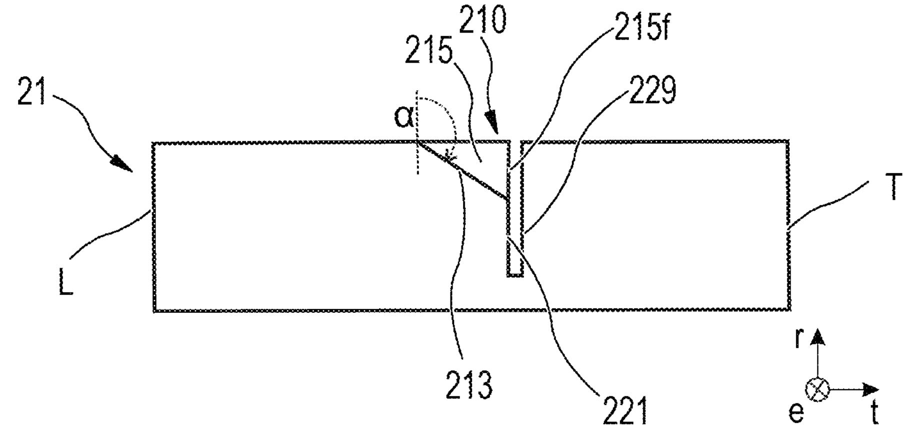

FIG. 6 shows a schematic perspective view of a tread block 21 comprising a leading edge L and a trailing edge T, as well as a (laterally) elongated sipe 210, extending along an elongated direction e through the tread block 21. The depth of the sipe 210 can be measured in the radial direction r, and the width of the sipe 210 in the transversal direction t, which extends perpendicularly to the elongation of the sipe 210 along the elongated direction e. The radial direction r, the elongated direction e, and the transversal direction r are also indicated in the following Figures where appropriate. In the embodiment of FIG. 6, the sipe 210 has a radially outer portion which is transversally broader than its radially inner bottom portion. In particular, the sipe 210 has a pair of opposite sidewalls 221 and 229, which extend along the elongated direction e, and wherein the leading sidewall 221 comprises a chamfer 213 at its radially outer edge. The opposite trailing sidewall 229 extends essentially linearly from a radially outermost surface of the tread block 21 towards the radially inner bottom of the sipe 210. As described already above in relation to the chamfers shown in FIGS. 3 and 4, the chamfer 213 at the leading sidewall 221 of tread block 21, according to the present embodiment of FIG. 6, allows snow to enter more easily into the sipe 210 and to be held in the sipe 210 by the opposite straight sidewall 229. In order to improve stability of the sipe 210, a supporting portion, or bump stop 215 is provided at the leading sidewall 221 which helps to keep the sipe, especially the chamfer 213 open when the tire rotates on the ground. The bump stop 215 preferably protrudes towards the opposite sidewall 229 and has a flat face side. In this context, FIG. 6*a* shows a schematic side view of the tread block 21, using the same reference signs as in FIG. 6, where appropriate. As visible in FIG. 6*a*, the flat and planar face side 215*f* extends essentially in parallel to the radially and/or linearly extending trailing sidewall 229. The chamfer 213, or, in other words, the chamfered surface, has an angle α with the radial direction r which is preferably within a range of 110° to 160°, and in the present example within a range of 120° to 130°. Furthermore, a transversal width of the sipe 210 may be within a range of 1 mm to 3.5 mm, preferably of 1.5 mm to 2.5 mm, particularly at its top portion (i.e., at a radially outer end of the chamfer 213), and within a range of 0.1 mm to 2.1 mm, preferably of 0.3 mm to 0.9 mm (or to 0.6 mm) at its radially inner portion and/or bottom. It is noted that one or more of such features and/or dimensions could also apply to the embodiments shown in FIG. 3 or 4.

FIG. 7 shows a perspective view of another embodiment of the present invention, in which a sipe 310 of a tread block 31 has a pair of opposite sidewalls 321, 329 extending along the elongated sipe 310. The corresponding tread block 31 is again shown with leading and trailing edges L, T. In contrast to the previously described embodiment, the embodiment of FIG. 7 has a transversally broader and chamfer-free sipe as well as a bump stop 315, which extends over the whole radial height of the sipe 310. In the present embodiment, the bump stop 315 can be described as a radially extending column and/or support having a flat or planar face side, which protrudes out of the leading sidewall 321, and/or extends essentially in parallel to the opposite trailing sidewall 329. In particular, the face side of the bump stop 315 extends in parallel to the opposite trailing sidewall 329 which extends linearly, and/or planarly between the radially outer top of the tread block 31 and a radially inner bottom of the sipe 310. Preferably, the bump stop 315 has an essentially rectangular cross-section, such as in a plane spanned by two of the radial direction r, the elongated direction e, and the transversal direction t. A width of the bump stop 315 in the elongated direction e is preferably at least 1 mm, and preferably within a range of 1 mm to 4 mm, or even more preferably, within a range of 1.5 mm to 3 mm, so as to provide a substantial support against forces transversal to the elongated sipe 310. A typical shortest distance, or smallest gap between the protruding face side of the bump stop 315 and the opposite sidewall 329 is within a range of 0.1 mm to 2.1 mm, and preferably to 1.1 mm, or only to 0.6 mm. A typical transversal width of the bump stop is within a range of 0.5 mm to 3.0 mm, preferably of 0.8 mm to 2.5 mm, or 1.0 mm to 2.5 mm. A typical transversal width of the sipe 310 is preferably within a range of 1 mm to 4.1 mm, or 1 mm to 2.6 mm. In the present embodiment, the bump stop 315 has been provided at the leading sidewall 321 of the sipe

310. However, in an alternative embodiment, the bump stop may also be provided at the opposite sidewall.

Figure 7A:
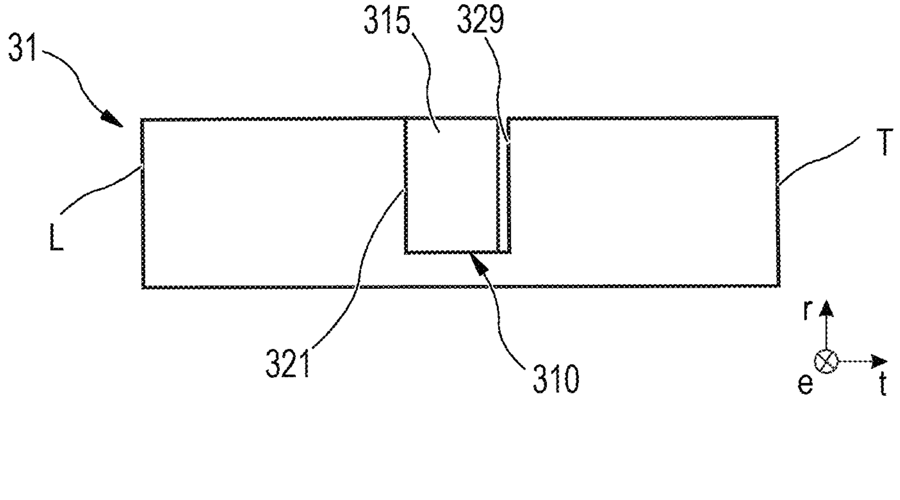

For the sake of better comprehensibility, FIG. 7*a* additionally shows a sideview of the tread block 31, using the same reference signs as in FIG. 7. Thus, as visible in FIG. 7*a*, the bump stop 315 extends over the whole radial height of the sipe 310 and a majority of its transversal width.

FIG. 8 shows a perspective view of still another embodiment of the present invention, in which a tread block 41 has a stepped sipe 410 with a pair of opposite sidewalls 421, 429 extending along the elongated sipe 410. Tread block 41 is again shown with leading and trailing edges L, T. In contrast to the previously described embodiments, the embodiment of FIG. 8 has a step portion, or step 413 in its radially upper half and a bump stop 415 which extends from a radially outer (or outermost) surface of the tread block 41 over the height of the step 413. In the present embodiment, the bump stop 415 can be described as a radially extending column having a flat, and/or planar face side, which protrudes out of the leading sidewall 421 over the transversal width of the step 413, and/or extends essentially in parallel to the opposite trailing sidewall 429. In particular, the face side of the bump stop 415 extends in parallel to the opposite trailing sidewall 429, which extends linearly, and/or planarly between the radially outer top of the tread block 41 and a radially inner bottom of the sipe 410. Preferably, the bump stop 415 has an essentially rectangular cross-section, such as in a plane spanned by two of the radial direction r, the elongated direction e, and the transversal direction t. A width of the bump stop 415 in the elongated direction e is preferably at least 1 mm (or a width as mentioned already above with respect to the embodiment of FIG. 7) so as to provide a substantial support against forces transversal to the elongated sipe 410. A typical shortest distance or smallest gap between the protruding face side of the bump stop 415 and the opposite sidewall 429 is within a range of 0.1 mm to 2.1 mm, preferably to 1.1 mm, or even just to 0.6 mm. A typical transversal width of the bump stop is within a range of 0.5 mm to 3 mm. This is also a preferred transversal width of the step 413. Radially below the step 413, a typical transversal width of the sipe 410 is within a range of 0.1 mm to 2.1 mm, preferably of 0.3 mm to 1.1 mm, or only to 0.6 mm. The stepped sipe 410 of FIGS. 8 and 8*a* helps to capture more snow when the tire is relatively new and to offer more void for snow on snow grip, e.g., compared to a chamfered sipe as shown in FIG. 6.

Figure 8A:
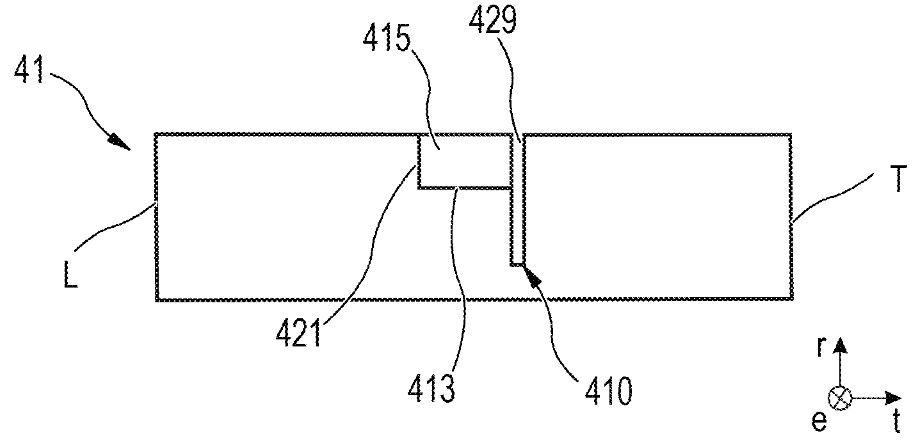

For the sake of better comprehensibility, FIG. 8*a* additionally shows a sideview of the tread block 41 using the same reference signs as in FIG. 8. Thus, as visible in FIG. 8*a*, the bump stop 415 extends over about 30% of the total radial height of the sipe 410, and over about 85% of the total transversal width of the sipe 410. The same value applies to the extension of the step 413.

FIG. 9 shows a schematic perspective view of a tread block 51 having a leading edge L, a trailing edge T, and a sipe 510 with a pair of opposite sidewalls 521, 529, which extend along the elongated direction e. Furthermore, the sipe 510 comprises a pair of bump stops 515L, 515T, wherein a first bump stop 515L is provided at a first, leading sidewall 521 of the pair of sidewalls 521, 529, and a second bump stop 515T is provided at a second, trailing sidewall 529 of the pair of sidewalls 521, 529. Both bump stops 515L, 515T face each other, or are, in other words, provided at essentially the same position along the direction of elongation e of the sipe 510. Each of the bump stops 515L, 515T protrudes from a respective one of the sidewalls 521, 529 transversally into the sipe 510 towards an opposite one of the sidewalls 529, 521. Moreover, the first bump stop 515L has a first wedged shape increasing in transversal thickness from the radially outer portion of the sipe 510 (and/or the radially outermost surface of the tread block 51) towards a radially inner bottom of the sipe 510, and the second bump stop 515T has a second wedged shape increasing in thickness from the radially inner bottom of the sipe 510 towards the radially outer portion of the sipe 510 (and/or the radially outermost surface of the tread block 51). In particular, both ramping face sides of the bump stops 515L, 515T extend essentially in parallel to each other. This relative arrangement is further indicated in the sideview of FIG. 9*a*.

FIG. 9*a* shows, using the same reference signs as in FIG. 9, where applicable, the parallel extension of both face sides 516L and 516T of the opposite bump stops 515L and 515T. The angle β of the face sides with the radial direction r is within a range of 20° to 60°, preferably of 20° to 50°, or even more preferably of 25° to 40°, and in the present example at about 35°. An aspect ratio of the transversal maximum width of one or more of the bump stops 515L, 515T and the radial height of those is within a range of 1:1 to 1:4, preferably within 1:1.5 to 1:3. The pair of bump stops 515L, 515T prevents again a potential closing of the sipe 510 due to forces which are at least partially transversal to the sipe 510. Moreover, the oppositely wedged, or, in other words, ramped shape of the bump stops 515L, 515T helps to improve traction, which is further described with respect to FIG. 9*b*.

FIG. 9*b* shows a sideview of the tread block 51 from the same perspective as in FIG. 9*a* (again using the same reference signs, where appropriate). In FIG. 9*b*, it is further assumed that the tread block 51 moves and/or accelerates in a direction of rotation of the tire, i.e., here from the leading edge L to the trailing edge T. The acceleration or rotation of a respective tire in such an orientation results in the schematically depicted deformation of the tread block 51, wherein the trailing bump stop 515T protrudes in a radially outer direction, while both bump stops 515L, 515T transversally touch each other so as to support the sipe 510 against closure. Thus, the trailing bump stop 515T helps to provide improved traction and/or snow grip. Moreover, it can be assumed that adjacent radially outer portions of the trailing sidewall 529 are also slightly moved radially outwards, thereby further improving traction, including snow scratching and/or grip.

FIG. 10 shows a perspective view of another embodiment of a tread block 61 which is similar to the tread block 51 according to the embodiment of FIG. 9, whereas tread block 61 is essentially oppositely oriented compared to tread block 51 of FIG. 9. Thus, FIG. 10 provides a perspective view of a tread block 61 having leading and trailing edges L, T, and a sipe 610 having a pair of opposite sidewalls 621, 629, including the leading sidewall 621 and the trailing sidewall 629. Furthermore, the tread block 61 comprises a pair of oppositely arranged and wedge-shaped bump stops 615L, 615T. Widths, radial extensions, and/or angles are preferably the same or similar as already indicated with respect to the aforementioned embodiment.

FIG. 10*a* further shows a sideview of the tread block 61 already shown in FIG. 10 (and using again the same reference signs, where appropriate). The opposite face sides 616T, 616L of bump stops 615T, 615L are arranged in parallel to each other.

As schematically indicated in FIG. 10*b*, a braking maneuver results in a deformation of the tread block 61 such that the oppositely arranged face sides of the bump stops 615L, 615T touch each other, and the leading bump stop 615L is pushed in a radially outer direction so as to radially protrude out of the sipe 610. Keeping the sipe 610 open and providing the radially outward protrusion of the bump stop 615L (as well as of the adjacent radially outer edge of the leading sidewall 621) helps to improve braking performance, particularly on snow.

Preferably, sipes mentioned in the present description have a maximum width, measured perpendicular to their elongated direction, within a range of 0.2 mm to 2.1 mm preferably from 0.3 mm to 1.9 mm. Sipes can also be mentioned as snow sipes herein. It is also noted that wider sipes or grooves may reduce tread block stiffness which may be less preferred.

Preferably, a sipe depth, or in other words radial height, is within a range of 1 mm to 20 mm, or of 1 mm to 15 mm, or of 1 mm to 10 mm, or of 1 mm to 5 mm. In other preferred embodiments, a sipe depth is within a range of 2 mm to 10 mm, or 2 mm to 5 mm, or 2 mm to 4 mm.

Preferably, one or more of the sipes as described herein above extend with one of a curved and a straight shape or path. Optionally, one or more of such sipes do not extend with a zig-zag shape or path.

Typically, the tread portion comprises a plurality of tread blocks, wherein most of or all of the tread blocks of the plurality of tread blocks preferably comprise from 1 to 10 sipes, preferably from 1 to 5 sipes, such as according to one or more of said aspects, or one or more of their embodiments.

In still another embodiment, one or more of said tread blocks, sipe sidewalls, and/or bump stops are formed by one or more elastomer compositions (e.g., rubber compositions). Such compositions are well-known in the tire art and are not within the focus of the present invention.

It is noted that a lateral tread groove, such as a groove separating two (circumferentially) neighboring tread blocks, is not intended to be considered as a sipe herein. Similarly, a transversal tread groove, such as a groove separating two (laterally or axially) neighboring tread blocks is not intended to be considered as a sipe herein either. Preferably, grooves may have (maximum) widths within a range of i) 2.5 mm, or 3 mm to ii) 20 mm, or 15 mm, or 10 mm, or 8 mm.

In still another embodiment, the tire is one or more of a pneumatic tire, a winter tire, an all-season tire, and a tire comprising a three peak mountain snowflake (3PMSF) symbol (such as present on the sidewall of the tire).

In still another embodiment, the tire is one of a passenger car tire, a light truck tire, and a truck tire.

In still another embodiment, the tire is a non-pneumatic tire.

It is emphasized that multiple aspects, or multiple embodiments, and/or features thereof can be combined with one another. Moreover, embodiments and/or features of one aspect can be embodiments and/or features of another aspect of the invention. Merely for the sake of conciseness such combinations have not been reiterated herein in their entirety.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising a circumferential tread portion having two axially opposite circumferential shoulder regions, a circumferential center region provided axially between the shoulder regions, tread blocks arranged in a V-shaped pattern, and lateral grooves which extend from a respective shoulder region to the circumferential center region, wherein a plurality of the tread blocks comprise one or more of chamfered leading edges and chamfered trailing edges, wherein for a plurality of the tread blocks, each tread block comprises a first sipe extending in a lateral direction and a second sipe extending transversally to the first sipe, wherein at least one of the tread blocks comprising the second sipe comprises a notch at a transversal end of the second sipe at one of the chamfered leading edges and chamfered trailing edges, wherein the notch is laterally broader and radially deeper than the second sipe, wherein at least one of the tread blocks comprises at least one laterally elongated sipe having a pair of laterally extending opposite sidewalls, and wherein a first sidewall of the pair of sidewalls optionally comprises a bump stop protruding into the sipe towards an opposite sidewall of the pair of sidewalls and extending at least partially along a radial height of the laterally elongated sipe, and wherein the tread portion further comprises transversal grooves, which extend transversally to the lateral grooves and delimit laterally adjacent tread blocks, wherein at least one transversal groove of the transversal grooves comprises i) a zig-zag portion extending along the transversal groove, and ii) a transversally extending bottom portion, which is provided radially below the zig-zag portion, and wherein a lateral width of the transversal groove is larger in the bottom portion than in the zig-zag portion.

2. The tire according to claim 1, wherein the second sipe extends transversally through the tread block with a zig-zag shape.

3. The tire according to claim 1, wherein a plurality of tread blocks in the shoulder regions of the tire comprise laterally extending sipes having a leading sidewall with a chamfered edge at a radially outer surface of the respective tread blocks.

* * * * *